United States Patent
Taylor et al.

(10) Patent No.: US 9,652,313 B2
(45) Date of Patent: May 16, 2017

(54) COLLECTION OF MEMORY ALLOCATION STATISTICS BY PROVENANCE IN AN ASYNCHRONOUS MESSAGE PASSING SYSTEM

(71) Applicant: Cisco Technology, Inc., San Jose, CA (US)

(72) Inventors: Jamie Lee Taylor, Raleigh, NC (US); Andrew William Keep, Durham, NC (US); Jonathan Gregory Rossie, Jr., Holly Springs, NC (US); Jonathan Mayer Sobel, Cary, NC (US); R. Kent Dybvig, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/792,955

(22) Filed: Jul. 7, 2015

(65) Prior Publication Data

US 2017/0010928 A1 Jan. 12, 2017

(51) Int. Cl.
*G06F 9/54* (2006.01)
*G06F 9/445* (2006.01)

(52) U.S. Cl.
CPC .......... *G06F 9/546* (2013.01); *G06F 9/44505* (2013.01)

(58) Field of Classification Search
CPC .......................... G06F 9/546; G06F 9/44505
See application file for complete search history.

(56) References Cited

U.S. PATENT DOCUMENTS

| | | | |
|---|---|---|---|
| 7,865,583 B2 | 1/2011 | Cohen et al. | |
| 7,992,045 B2 | 8/2011 | Bansal et al. | |
| 8,549,090 B2 | 10/2013 | Gotlieb et al. | |
| 2010/0005466 A1 | 1/2010 | MacFarlane et al. | |
| 2014/0040194 A1* | 2/2014 | Krasensky | H04L 47/34 707/613 |
| 2014/0222994 A1* | 8/2014 | Castro | H04L 43/08 709/224 |

OTHER PUBLICATIONS

Majumdar et al. "Static Provenance Verification for Message Passing Programs"; MPI-SWS, Germany and University of Kaiserslautern, Germany; pp. 1-21, 2013.

(Continued)

*Primary Examiner* — Syed Roni
(74) *Attorney, Agent, or Firm* — Parker Ibrahim & Berg LLC; James M. Behmke; Stephen D. LeBarron

(57) ABSTRACT

In one embodiment, a method is disclosed that includes executing, by a device, one or more programs that use asynchronous message passing. The one or more programs comprise instrumentation code that causes message context information to be generated regarding asynchronous messages passed by the one or more programs. The message context information is indicative of one or more points within the one or more programs at which a particular message is sent or received. The method includes maintaining a current message context associated with a particular portion of the one or more programs. The method includes receiving a first asynchronous message that includes message context information for the received message. The method includes updating the current message context to include the message context information received via the first asynchronous message.

18 Claims, 6 Drawing Sheets

FIG. 6

(56) References Cited

OTHER PUBLICATIONS

YourKit; "Allocation Recording"; https://www.yourkit.com/docs/80/help/allocations.jsp; p. 1, 2003.
Wikipedia; "Call Stack"; https://en.wikipedia.org/wiki/Call_stack; pp. 1-8.
James R. Larus "Whole Program Paths"; Microsoft Research; May 1999; pp. 1-11.
Wikipedia; "Message Passing"; http://en.wikipedia.org/wiki/Message_passing; pp. 1-6.
Wikipedia; "Profiling (computer programming)"; https://en.wikipedia.org/wiki/Profiling_(computer_programming); pp. 1-6.
Ross Bencina; "Programming with lightweight asynchronous messages: some basic patterns"; Dec. 17, 2012; pp. 1-11.

\* cited by examiner

COLLECTION OF MEMORY ALLOCATION STATISTICS BY PROVENANCE IN AN ASYNCHRONOUS MESSAGE PASSING SYSTEM

TECHNICAL FIELD

The present disclosure relates generally to an asynchronous message passing system and, more particularly, to collecting memory allocation statistics by provenance in an asynchronous message passing system.

BACKGROUND

In general, profiling refers to a collection of techniques that allow a programmer to obtain information about the execution flow of a software program. For example, a programmer may use profiling to learn information about a program such as which calls are made during execution of the program, statistics regarding the calls (e.g., durations, frequencies, etc.), or any other information regarding the execution of the program. In some cases, a program may be profiled by taking random samples of the program counter of the executing program and deriving statistics from the samples. In other cases, programmatic "hooks" may be inserted into the program itself, to capture information regarding the execution flow of the program. However, this process, also known as instrumenting, can change the execution characteristics of the program, as the instrumented code will also need to be executed.

Profiling that captures the amount and location of memory allocation is an important tool for a programmer who wishes to reduce memory footprint or discover the source of memory leaks in a software system. When some memory allocation operations occur in common subroutines, the information captured may be of insufficient help to the programmer. In such cases, the programmer needs to know the "provenance" of the memory allocation, i.e., the sequence of events that lead to it.

In traditional, stack-based languages and runtimes, capturing provenance information is fairly straightforward using standard profiling techniques. In particular, the current execution stack itself is the provenance. However, these techniques are not as effective in systems that use asynchronous message passing. Instead, in an asynchronous message passing system, the stack information available to the memory profiling instrumentation contains only that information which has accumulated since the most recent input. This means that the true source of an execution event of interest (e.g., a memory/object allocation, etc.) may be obscured.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a method is disclosed that includes executing, by a device, one or more programs that use asynchronous message passing. The one or more programs comprise instrumentation code that causes message context information to be generated regarding asynchronous messages passed by the one or more programs. The message context information is indicative of one or more points within the one or more programs at which a particular message is sent or received. The method includes maintaining a current message context associated with a particular portion of the one or more programs. The method includes receiving a first asynchronous message that includes message context information for the received message. The method includes updating the current message context to include the message context information received via the first asynchronous message.

Description

Figure 1:
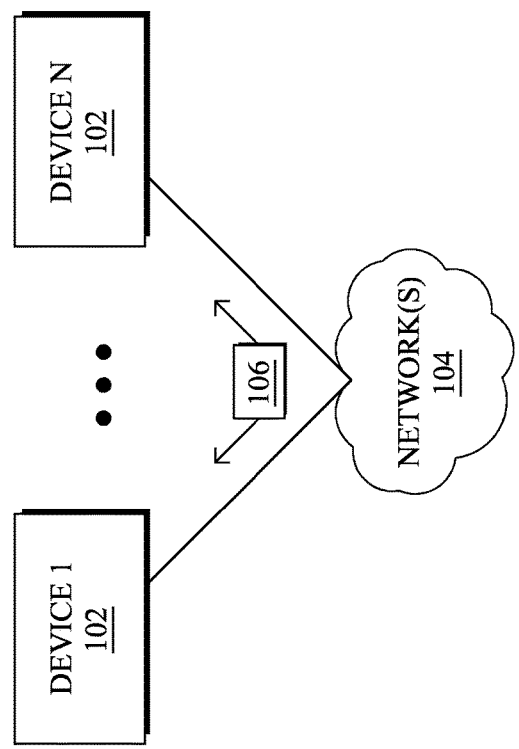
FIG. 1 illustrates an example computer system.

FIG. 1 is a schematic block diagram of an example computer system 100 illustratively comprising any number of devices 102 (e.g., a first through nth device) that communicate via one or more networks 104. Network(s) 104 may include any number of networking devices (e.g., routers, switches, intermediary servers, etc.) that facilitate communications between devices 102. For example, network(s) 104 may include, but are not limited to, local area networks (LANs), wide area networks (WANs), wireless networks, hardwired networks, optical networks, satellite networks, combinations thereof, or the like. In addition, network(s) 104 may employ any number of different communication protocols such as the Internet Protocol (IP), Multiprotocol Label Switching (MPLS), etc., that facilitate the routing of data packets 106 between devices 102.

Network(s) 104 may comprise wired and/or wireless links, in various embodiments. Example wireless links may include, but are not limited to, WiFi links, radio links, near field communication links, cellular links, satellite links, or the like. Example wired links may include, but are not limited to, fiber optic links, power line communication (PLC) links, coaxial cabling, Ethernet or other data network cabling, etc.

Figure 2:
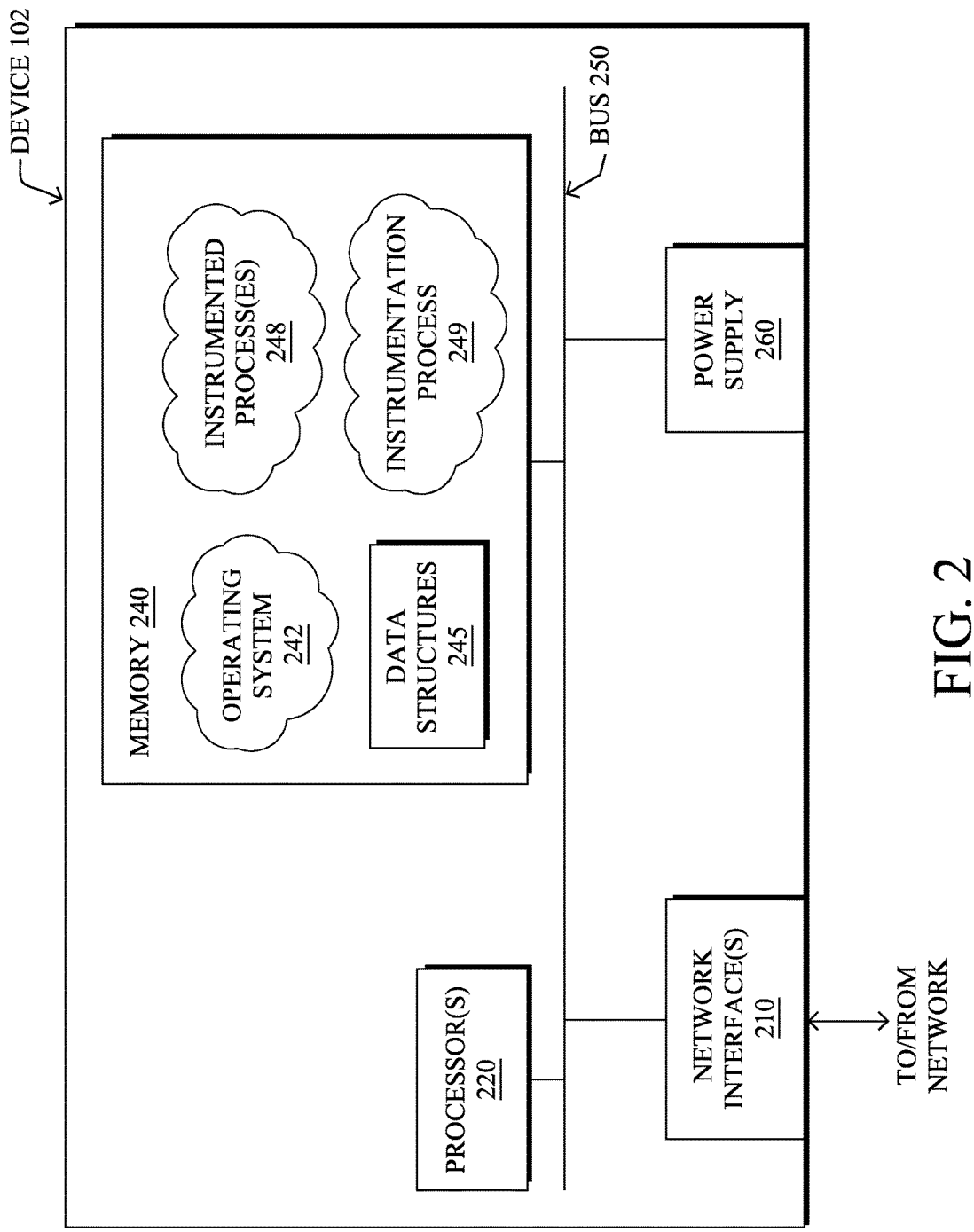
FIG. 2 illustrates an example computing device.

FIG. 2 is a schematic block diagram of an example device 102 that may be used with one or more embodiments described herein. For example, device 102 may be an end user computing device (e.g., a desktop device, a portable electronic device, etc.), a server, or a networking device (e.g., a switch, router, hub, etc.). The device 102 may comprise one or more network interfaces 210 (e.g., wired, wireless, power line communication, etc.), at least one processor 220, and a memory 240 interconnected by a system bus 250 and powered by a power supply 260 (e.g., battery, plug-in, etc.).

The network interface(s) 210 include the mechanical, electrical, and signaling circuitry for communicating data over links coupled to the network(s) 104. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes/services may comprise an instrumentation process 249 and/or one or more instrumented processes 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Instrumentation process 249 may be operable to generate instrumented process(es) 248 by inserting instrumentation code into the programming of process(es) 248, according to various embodiments. In general, instrumentation code may be executed as part of the execution of the base program, to gather information about the execution of the base program. For example, assume that the base program includes a function foo( ). Instrumentation code may be added to foo( ), to record whenever foo( ) is called during execution of the base program. In various embodiments, instrumentation process 249 may insert the instrumentation code into the program code of process(es) 248, prior to, or during, compilation of process(es) 248.

Figure 3A:
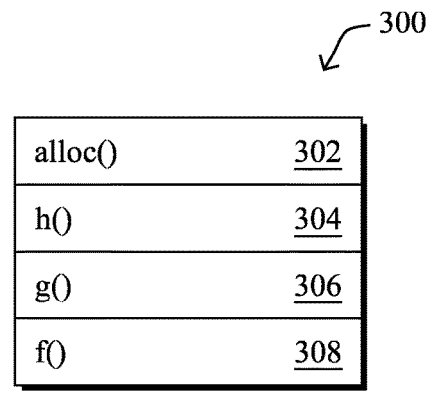
FIGS. 3A-3B illustrate examples of memory allocations/code invocations.
Figure 3B:
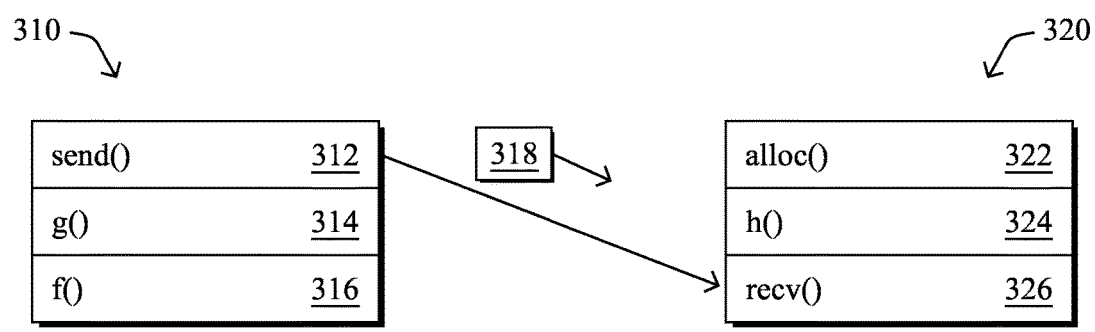

FIGS. 3A-3B illustrate examples of memory allocations/code invocations, according to various embodiments. As shown in FIG. 3A, an execution stack 300 is shown for an example program that uses a single execution stack. In a stack-based system, functions/subroutines are invoked by adding information regarding a given function/subroutine to a frame of the stack. A given frame may include information regarding parameters that are to be passed to the function/subroutine, a return address of the caller of the function/subroutine, local parameters for the called function/subroutine, etc. For example, as shown, execution stack 300 may include stack frames 302-308 that are associated with the various functions/subroutines, alloc( ), h( ), g( ), and f( ), respectively. During execution of the program, the top frame of the stack is typically executed and popped off the stack when execution of the frame completes. Control is then returned to the next highest frame in the stack.

As noted previously, determining the provenance of a memory allocation in a stack-based system is relatively straightforward. In particular, this information may be captured by analyzing the most recent n-number of frames on the stack. For example, provenance for the memory allocation associated with stack frame 302 may be traced back to the original calling function, f( ), by analyzing stack 300. Notably, f( ) may call g( ), which may call h( ), which may call alloc( ), thereby leading to the memory allocation. Thus, by analyzing stack frames 302-308, the memory allocation may be traced all the way back to f( ). This information may be of use to a programmer, particularly if the memory allocation is unintended and/or to optimize the memory usage of the program.

FIG. 3B illustrates program execution in an asynchronous message passing system, according to various embodiments. In general, an asynchronous message passing system relies on the passing of messages between various functions or agents. In contrast to a stack-based system in which the currently executing function can examine or access the complete sequence of calls that resulted in its execution, the portion of the call sequence before the input to the currently executing agent is not available. As shown, consider the case in which stacks 310 and 320 are associated with separate agents and include frames 312-316 and 322-326, respectively. For example, stack 320 may be associated with a helper agent that services requests from many other agents.

During execution of stack 310, function f( ) may invoke function go, similar to the example shown in FIG. 3A. However, rather than invoking function h( ) directly, as in FIG. 3A, g( ) may instead invoke a send function, send( ), that passes an asynchronous message 318 to the helper agent associated with stack 320. Such an operation may be considered to be asynchronous in that the sending routine may continue to execute, without having to wait for the helper agent to take the corresponding actions prompted by message 318, if any. In other words, the executing code associated with stack 310 may assume that the code associated with stack 320 will process message 318 as needed. For example, in response to receiving message 318 via receive function recv( ), recv( ) may call function h( ). In turn, h( ) may call alloc( ), which causes the memory allocation to occur.

A standard approach to capturing statistics about memory allocations is to track the counts and/or sizes of the allocated objects. This information may then be aggregated on a per-object type or, in an asynchronous message passing system, on a per-agent basis, to provide statistics regarding the execution of the program(s). When objects are deallocated, the contributions of the deallocated objects to the aggregated totals may be removed. For example, information regarding the execution of alloc( ) may be captured and used to provide some statistics regarding memory allocations by the executing program.

While tracking counts and/or sizes of allocated objects may provide some insight into the operation of a system that uses asynchronous messaging, doing so does not provide any information as to why so many of a given object exist or why so many allocations occurred at any given point in time. In addition, using the above stack analysis approach to determine the origin of an allocation will not identify the true origin of an allocation. For example, in the case shown in FIG. 3B, a memory allocation may be made by a helper agent (e.g., as represented by stack 320), in response to receiving a passed message 318 from another agent. Thus, simply recording information regarding the stack execution leading up to alloc( ) will not provide any insight as to why the memory allocation occurred. In particular, analyzing the execution of stack 320 will only provide the execution path back to the latest message receipt, e.g., back to recv( ). However, the true execution path leading up to the allocation may trace all the way back to f( ).

Collection of Memory Allocation Statistics by Provenance in Asynchronous Message Passing Systems The techniques herein allow for an asynchronous message passing system to preserve provenance information regarding memory allocations. In some aspects, the passed messages may be adapted to include or be associated with context information regarding sends and receives, thereby recording an execution path leading up to a message receipt, which may then be examined upon memory allocation. The captured provenance information may also be aggregated to determine statistics such as memory allocation counts per object type and/or per execution path.

Illustratively, the techniques described herein may be performed by hardware, software, and/or firmware, such as in accordance with the processes 248-249 shown in FIG. 2, which may include computer executable instructions executed by the processor 220 (or independent processor of interfaces 210) to perform functions relating to the techniques described herein.

Specifically, according to one or more embodiments, a method is disclosed that includes executing, by a device, one or more programs that use asynchronous message passing. The one or more programs comprise instrumentation code that causes message context information to be generated regarding asynchronous messages passed by the one or more programs. The message context information is indicative of one or more points within the one or more programs at which a particular message is sent or received. The method includes maintaining a current message context associated with a particular portion of the one or more programs. The method includes receiving a first asynchronous message that includes message context information for the received message. The method includes updating the current message context to include the message context information received via the first asynchronous message.

Figure 4A:
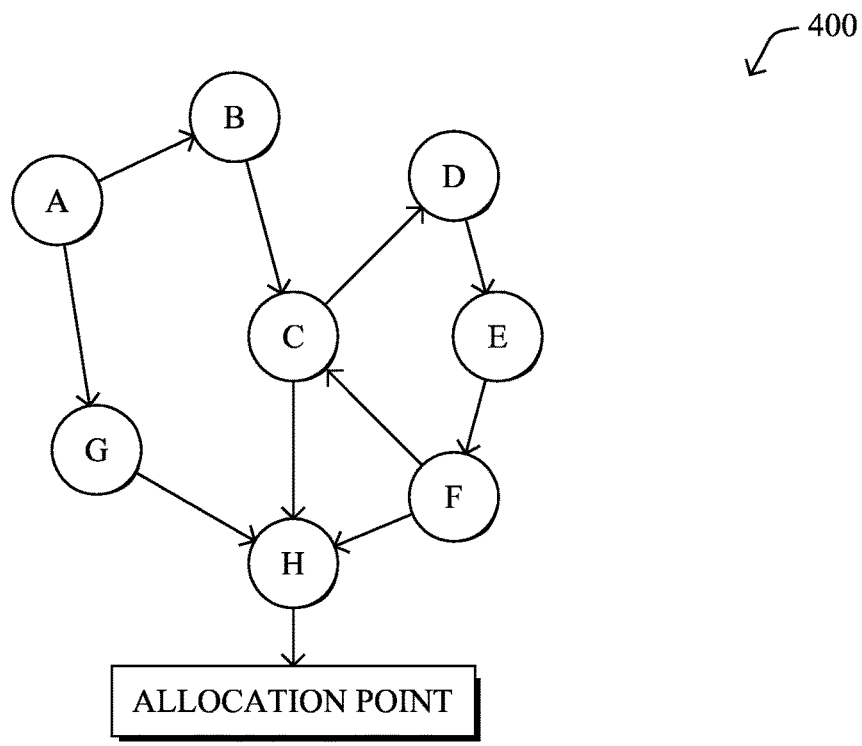
FIGS. 4A-4B illustrate example execution paths.
Figure 4B:
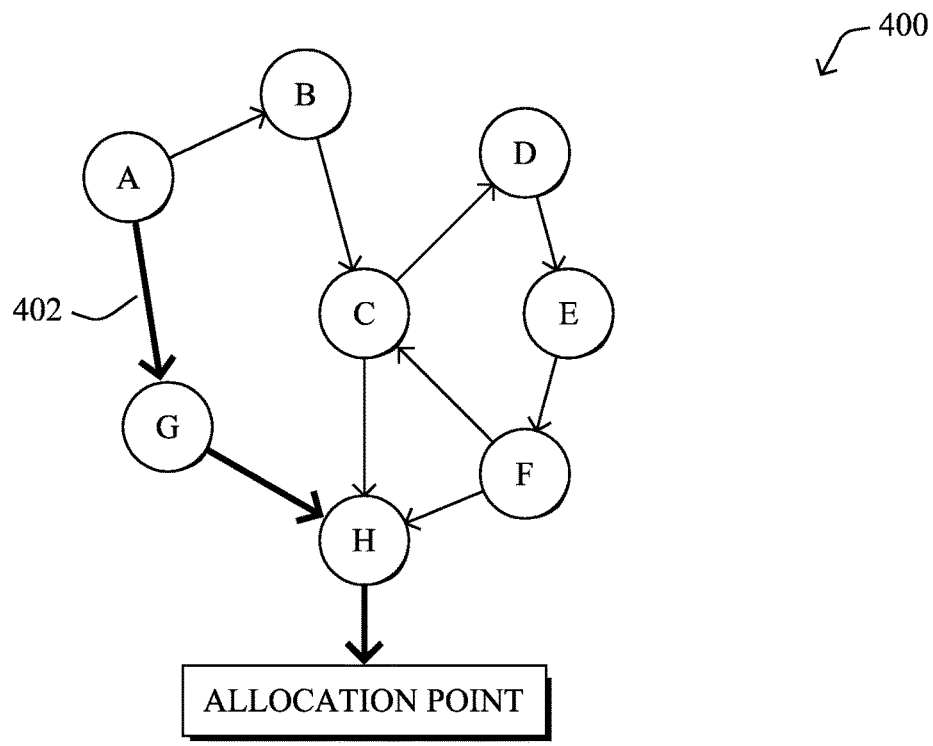

Operationally, FIGS. 4A-4B illustrate example execution paths in an asynchronous message passing system, according to various embodiments. As shown in FIG. 4A, consider the case in which a program or set of programs include execution points A-H. If the system uses asynchronous message passing, the execution flows shown may span multiple functions or agents. For example, assume that execution point H is associated with a helper function that ultimately allocates an object or otherwise allocates additional memory. Thus, similar to the example of FIG. 3B, message passing between the various execution points A-H may obscure the true cause of the allocation.

According to various embodiments, message contexts may be tracked and recorded, to capture message flows within a message passing system. For example, as shown in FIG. 4B, assume that the message flow 402 led to an object being allocated at the allocation point shown. In some embodiments, instrumentation code may be added to the program(s) (e.g., prior to, or during, compilation, at link time, during execution, etc.), to maintain a register that tracks the current message context. At each message send, the current message context may be extended with the location of the send and the resulting context information included in or associated with the sent message. At each message receive, the current context may be set to the context included in or associated with the message, if any, and may be extended with the receive location. When an agent chooses to execute code for some reason other than message receipt (e.g., a timeout condition or a handler executed upon the halt of the agent), the message context may be set to a location corresponding to the executed code or to an empty location. By implementing these techniques, the message/execution path leading up to a memory allocation can be tracked and recorded.

In one example, assume that a message is passed from point A to G. In such a case, the inserted instrumentation code may cause the message to include an indication that the message originated from point A. In turn, a message passed from G to H may include context information indicating the chain from A to G to H. In doing so, path 402 may be associated with the resulting memory allocation, thereby indicating the provenance of the allocation. As would be appreciated, transitions between points A-H may occur across different functions/agents (e.g., by passing messages) or may occur as part of the execution of an individual function/agent (e.g., A may transition to G and then a message is sent from G to H in a helper agent).

The resulting provenance information using the techniques herein may be aggregated with other captured information, to form statistics regarding the various memory allocations. For example, path 402 may be associated with the particular type of object allocated at the allocation point shown. This information may then be used to generate allocation statistics for the particular type of object (e.g., how many times each path led to an allocation of the object type, etc.), statistics for path 402 (e.g., aggregated across all types of objects), and/or any other information that may be of use to a programmer when analyzing the execution of the message passing system.

In some cases, a message context may become excessively long, if no mechanisms are in place to limit a context. This may become problematic from a performance standpoint and, for example, if the paths are used as keys for purposes of aggregation when generating the statistics. Notably, in an embodiment where the data structures containing aggregation data are implemented via hash tables or tree structures, these structures will take longer to compute a hash value or traverse internal nodes in the tree structure when the message context is larger (i.e., has longer paths), potentially impinging on system performance. For example, consider the case in which an agent performs a unit test whereby a helper agent sends a message to itself. In such a case, the context may grow to a size that could overwhelm the system.

In one embodiment, a given message context may be limited to a maximum size. For example, a message context may be limited to including information regarding only the most recent x-number of messages. If such a limit has been reached, the oldest entry may be removed in favor of the newest entry. Such a limit may be set at compile time or based on a parameter setting. For example, a hard limit of ten entries may be set for any given message context during compilation.

In further embodiments, loops may be detected in the current message context and a single entry for a given loop included in the recorded context. For example, consider the potential message loop of C→D→E→F→C shown in FIG. 4B. In such a case, this loop may only be recorded once in the current context, regardless of how many times the loop is executed. In one embodiment, a count may also be maintained to record the number of times the loop was executed. In further embodiments, a grammar may be synthesized to indicate a common part of a message path. However, doing so may also impinge on system performance.

Figure 5:
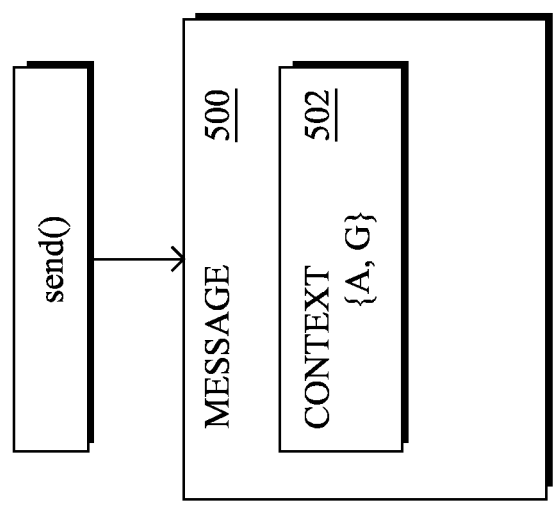
FIG. 5 illustrates an example asynchronous message.

Referring now to FIG. 5, an example message 500 is shown, according to various embodiments. Consider the case in which send( ) generates and sends a message 500 asynchronously from execution point G to point H shown in FIGS. 4A-4B. In such a case, the instrumentation code inserted into send( ) may cause message context 502 to be included in message 500. If the current message context during the send indicates point A (e.g., from a previously received message from point A), send( ) may extend this context to further indicate that message 500 is being sent from point G, to track the message path back to point A.

In one embodiment, each entry in a message context may be represented as a pair of integers with one of the integers indicating a look-aside file and the other integer indicating an index for an entry in the file. Thus, a message path may be represented as a list of look-aside file and file entry indexes. Using this approach, new elements may also be added in constant time. The indicated entries in the look-aside files can later be translated into source positions, which can be used to look up related information such as argument counts, etc. Alternatively, the source position information itself may be stored directly in the message contexts. However, doing so will not be as compact as storing the context information using integer pairs. In addition, using integer pairs may be faster when hashing the lists since the leaves are simply integers.

In some systems, messages that have logically distinct provenances are indistinguishable. For example, they may be numbers, or they may be so common that a "flyweight" pattern has been used to eliminate repeated allocation of resources to represent the same message data. In some embodiments, a unique message wrapper is created for each message, in order to distinguish these messages and associate them with distinct allocation provenance.

In further embodiments, the current message context may instead be moved to a shared memory or attached to a record, to support multi-process systems. In yet another embodiment, records may be streamed directly to a logging service and aggregated at a later time. Regardless of how the message contexts are captured, this information may be aggregated in any number of different ways, to provide a programmer insight into how and why the message passing system allocates memory.

As would be appreciated, further execution information may also be captured, in addition to capturing the message contexts. For example, in one embodiment, information regarding which execution branches are taken may be captured by instrumentation code, in addition to recording the message send and receive points. In another embodiment, stack information may be captured after a message is received (e.g., the corresponding j-number of stack frames, etc.).

Figure 6:
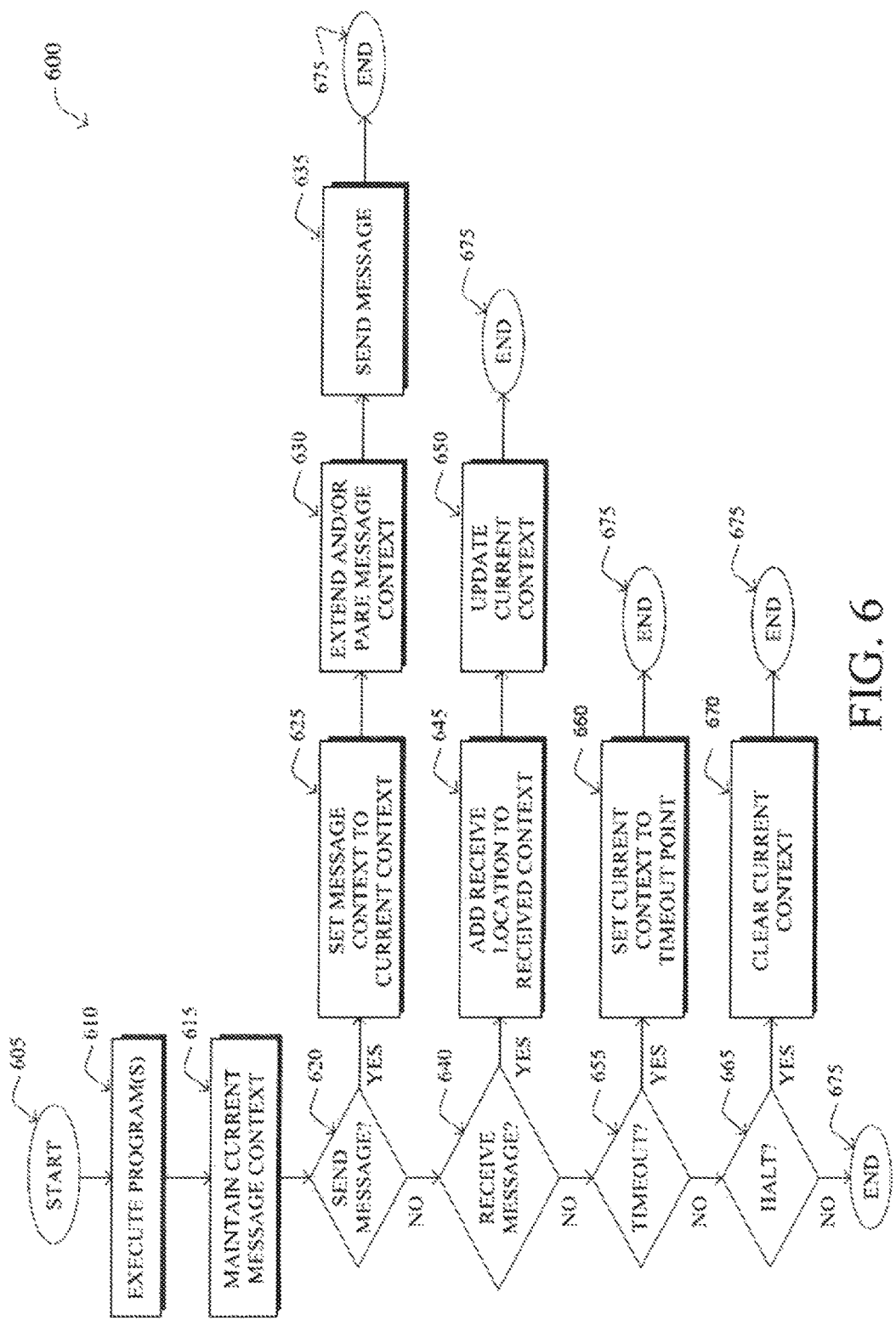
FIG. 6 illustrates an example simplified procedure for collecting memory allocation information in an asynchronous message passing system.

Referring now to FIG. 6, an example simplified procedure is shown for collecting memory allocation information in an asynchronous message passing system, according to various embodiments. Procedure 600 may begin at step 605 and continue on to step 610 where, as described in greater detail above, a device (e.g., device 102, etc.) may execute one or more programs, which may use asynchronous message passing. In some embodiments, the executed one or more programs may include instrumentation code that causes message context information to be generated. Such context information may indicate the one or more points within the executed code at which messages are sent and/or received. In one embodiment, the device itself may insert the instrumentation code into the program(s), prior to, or while, compiling the program(s). In other embodiments, the device may receive the compiled, previously instrumented program(s) form another device. In a further embodiment, the device may insert the instrumentation code during runtime.

At step 615, as detailed above, the device may maintain the current message context. In general, the current message context indicates the send and/or receive points within the executing program(s) that are associated with a particular message path. For example, if messages were sent from points A→B and then from B→C, the corresponding message context may indicate the message flow from A→B→C.

At step 620, a decision may be made as to whether or not a message is to be sent, as described in greater detail above. If not, procedure 600 may continue on to step 640. Otherwise, if a message is to be sent, procedure 600 may continue on to step 625.

At step 625, if a message is to be sent, the message context for the message may be set to the current context. At step 630, the message context may be extended with the execution point/location of the send. In some embodiments, the message context may also be pared, in conjunction with extending the context with the send location. For example, a length limit may be used to limit the size of the context. The message may then be sent at step 635 and comprise data indicative of the current context extended with the send location. Procedure 600 then ends at step 675.

At step 630, as detailed above, the context information (e.g., the current context plus the send location) may be pared down or otherwise limited, in some embodiments. For example, assume that there is a maximum limit on the number of entries that are allowed for a given message context (e.g., the most recent ten send/receive points, etc.). In such a case, the oldest entry in the message context may be removed, prior to including the context information in the message to be sent. In other embodiments, loops may be removed from the context or otherwise represented only once in the context.

At step 635, the context information may be included in the sent message, as described in greater detail above. By doing so, the message may include information regarding the execution path that was taken leading up to the sent message. In doing so, subsequent operations that result from the message may be associated with the execution path and message. For example, a memory allocation routine may analyze the current context register, to determine the execution path leading up to a memory allocation. Procedure 600 then ends at step 675.

At step 640, a decision may be made as to whether or not a message has been received, as detailed above. If so, procedure 600 may continue on to step 645. Otherwise, procedure 600 may continue on to step 655.

At step 645, as described in greater detail above, if a message has been received, the receive location may be added to the context included in the received message, if such context information is included in the message. In turn, at step 650, the current message context may be updated to indicate the receive location and, if available, the context information received as part of the message. Procedure 600 then ends at step 675.

At step 655, a decision may be made as to whether a timeout has occurred, as detailed above. If not, procedure 600 may continue on to step 665. Otherwise, if a timeout has occurred, procedure 600 may continue on to step 660 where, as detailed above, the current context maintained in step 615 may be set to indicate the point of execution of the timeout. Procedure 600 then ends at step 675.

At step 665, a decision may be made as to whether a halt has occurred, as detailed above. If not, procedure 600 may end at step 675. Otherwise, if a halt has occurred, the current context maintained in step 615 may be cleared at step 670, as detailed above. Procedure 600 then ends at step 675.

It should be noted that while certain steps within procedure 600 may be optional as described above, the steps shown in FIG. 6 are merely examples for illustration and certain other steps may be included or excluded as desired. Further, while a particular order of the steps is shown, this ordering is merely illustrative, and any suitable arrangement of the steps may be utilized without departing from the scope of the embodiments herein. Additionally, procedure 600 and/or any of the steps of procedure 600 may be repeated any number of times.

The techniques described herein, therefore, provide for the capturing of information regarding the events leading up to a memory allocation in an asynchronous message passing system. This information may be used by software developers and other interested parties to diagnose memory leaks and/or take actions to optimize the amount of memory used by the executing system.

While there have been shown and described illustrative embodiments that provide for the capture of memory allocation statistics by provenance in an asynchronous message passing system, it is to be understood that various other adaptations and modifications may be made within the spirit and scope of the embodiments herein. For example, the embodiments have been shown and described herein primarily with respect to certain configurations. However, the embodiments in their broader sense are not as limited, and may, in fact, be used with other types of networks and/or protocols (e.g., other location-determining mechanisms, etc.). For example, while the techniques herein have been described primarily with respect to determining the provenance of memory allocations on a single device, the techniques herein may also be applied for use in multi-process or distributed systems.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A Method comprising:
   executing, by a device, one or more programs that use asynchronous message passing, wherein the one or more programs comprise instrumentation code that causes message context information to be generated regarding asynchronous messages passed by the one or more programs, wherein the message context information is indicative of one or more points within the one or more programs at which a particular message is sent or received;
   maintaining a current message context associated with a particular portion of the one or more programs;
   receiving a first asynchronous message that includes message context information for the received message;
   updating the current message context to include the message context information received via the first asynchronous message;
   determining that a timeout has occurred in the one or more programs; and
   setting the current message context to indicate a point in the one or more programs at which the timeout occurred.

2. The method as in claim 1, further comprising:
   sending a second asynchronous message that includes data indicative of the current message context and an indication of a point in the one or more programs at which the particular asynchronous message is sent.

3. The method as in claim 2, further comprising:
   removing, from the current message context and prior to including the data indicative of the current message context in the second asynchronous message, message context information corresponding to an oldest send or receive point in the one or more programs, based on a size of the current message context.

4. The method as in claim 2, further comprising:
   removing, from the current message context and prior to including the data indicative of the current message context in the second asynchronous message, message context information corresponding to one or more send or receive points in the one or more programs, based on the removed one or more send or receive points being associated with a message loop.

5. The method as in claim 1, further comprising:
   determining that a halt has occurred in the one or more programs; and
   clearing the current message context in response to the halt occurring.

6. The method as in claim 1, wherein the first asynchronous message comprises a message wrapper that uniquely identifies the first asynchronous message.

7. The method as in claim 1, wherein the particular portion of the one or more programs corresponds to a message path or a particular object in the one or more programs.

8. The method as in claim 1, further comprising:
   using the current message context to generate statistics comprising at least one of: an object count or an allocated amount of memory.

9. The method as in claim 1, further comprising:
   inserting the instrumentation code into the one or more programs.

10. An apparatus, comprising:
    a processor configured to execute one or more programs; and
    a memory configured to store the one or more programs executable by the processor, the one or more programs when executed being operable to use asynchronous message passing, wherein the one or more programs comprise instrumentation code that causes message context information to be generated regarding asynchronous messages passed by the one or more programs, wherein the message context information is indicative of one or more points within the one or more programs at which a particular message is sent or received, wherein the one or more programs when executed are operable to:
    maintain a current message contest associated with a particular portion of the one or more programs;
    receive a first asynchronous message that includes message context information for the received message;
    update the current message context to include the message context information received via the first asynchronous message;

determine that a timeout has occurred in the one or more programs; and
set the current message context to indicate a point in the one or more programs at which the timeout occurred.

11. The apparatus as in claim 10, wherein the one or more programs when executed are operable to:
send a second asynchronous message that includes data indicative of the current message context and an indication of a point in the one or more programs at which the particular asynchronous message is sent.

12. The apparatus as in claim 11, wherein the one or more programs when executed are operable to:
remove, from the current message context and prior to including the data indicative of the current message context in the second asynchronous message, message context information corresponding to an oldest send or receive point in the one or more programs, based on a size of the current message context.

13. The apparatus as claim 11, wherein the one or more programs when executed are operable to:
remove, from the current message context and prior to including the data indicative of the current message context in the second asynchronous message, message context information corresponding to one or more send or receive points in the one or more programs, based on the removed one or more send or receive points being associated with a message loop.

14. The apparatus as in claim 10, wherein the one or more programs when executed are operable to:
determine that a halt has occurred in the one or more programs; and
clear the current message context in response to the halt occurring.

15. The apparatus as in claim 10, wherein the first asynchronous message comprises a message wrapper that uniquely identifies the first asynchronous message.

16. The apparatus as in claim 10, wherein the particular portion of the one or more programs corresponds to a message path or a particular object in the one or more programs.

17. The apparatus as in claim 10, wherein the apparatus is further operabale to insert the instrumentation code into the one or more programs.

18. A tangible, non-transitory, computer-readable media having software encoded thereon, the software when executed by a processor on a device in a computer network operable to:
execute, by the device, one or more programs that use asynchronous message passing, wherein the one or more programs comprise instrumentation code that causes message context information to be generated regarding asynchronous messages passed by the one or more programs, wherein the message context information is indicative of one or more points within the one or more programs at which a particular message is suit or received;
maintain a current message context associated with a particular portion of the one or more programs;
receive a first asynchronous message that includes message context information for the received message;
update the current message context to include the message context information received via the first asynchronous message;
determine that a timeout has occurred in the one or more programs; and
set the current message context to indicate a point in the one or more programs at which the timeout occurred.

* * * * *